United States Patent
Lindskog et al.

(10) Patent No.: US 8,804,548 B2
(45) Date of Patent: Aug. 12, 2014

(54) ENHANCED UPLINK USER ENTITY RATE LIMITATION SIGNALLING

(75) Inventors: Jan Lindskog, Pixbo (SE); Pär Ankel, Nödinge (SE); Björn Folkstedt, Mölndal (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 84 days.

(21) Appl. No.: 12/745,941

(22) PCT Filed: Dec. 3, 2007

(86) PCT No.: PCT/SE2007/050929
§ 371 (c)(1),
(2), (4) Date: Jun. 3, 2010

(87) PCT Pub. No.: WO2009/072940
PCT Pub. Date: Jun. 11, 2009

(65) Prior Publication Data
US 2010/0265964 A1    Oct. 21, 2010

(51) Int. Cl.
*H04J 1/16* (2006.01)
*H04J 3/16* (2006.01)

(52) U.S. Cl.
USPC .......................... 370/252; 370/329; 370/465

(58) Field of Classification Search
USPC ......................................... 370/252, 329, 465
See application file for complete search history.

(56) References Cited

U.S. PATENT DOCUMENTS

| | | | |
|---|---|---|---|
| 2007/0026865 A1* | 2/2007 | Yano et al. | 455/438 |
| 2007/0066339 A1* | 3/2007 | Usuda et al. | 455/522 |
| 2008/0064386 A1* | 3/2008 | Nibe | 455/422.1 |
| 2008/0194282 A1* | 8/2008 | Nibe et al. | 455/522 |
| 2008/0212521 A1* | 9/2008 | Jou | 370/320 |

(Continued)

FOREIGN PATENT DOCUMENTS

| | | |
|---|---|---|
| EP | 1 655 907 A1 | 5/2006 |
| EP | 1708524 A1 | 10/2006 |
| JP | 2002-204477 A | 7/2002 |
| WO | WO 2006/024519 A1 | 3/2006 |
| WO | WO 2007027512 A2 | 3/2007 |

*Primary Examiner* — Andrew Lee

(57) ABSTRACT

A method for a user entity (UE) transmitting data said data being receivable by at least a serving node (B1) and a non serving node (B2); the user entity (UE) being adapted for receiving a first signal (ABS GRNT E-AGCH) (4, 6) from a serving node (B1) granting the user entity permission to transmit at a given signalling rate; the user entity (UE) being adapted for receiving a second signal (8) from a non-serving node (B2) instructing the user entity to limit its signalling rate (DOWN E-RGCH). The user entity (UE) is being adapted to transmit data packets and associating a third signal (HAPPY, 7) and the user entity (UE) is being adapted to transmit data packets and associating a fourth signal (NOT HAPPY, 1, 9) with the data packet transmission indicating the user entity wishing to being granted permission to use a higher signalling rate than it is currently being permitted to use by the serving node (B1). The user entity is being adapted for issuing a signalling rate limitation signal (UE RATE LMT, 9') to the serving node, indicating the user entity having limited its signalling rate signal below the signalling rate granted to it by the serving node B. There is moreover provided a method for a Node B, which as a non-serving Node B (B2) is transmitting on the E-RGCH, a situation signal (E-RGCH CEASE 14, 15') being indicative of a cease ceased 9" of an interference situation.

20 Claims, 9 Drawing Sheets

(56) References Cited

U.S. PATENT DOCUMENTS

| | | | |
|---|---|---|---|
| 2009/0036155 A1* | 2/2009 | Wu et al. | 455/522 |
| 2010/0265964 A1* | 10/2010 | Lindskog et al. | 370/431 |
| 2011/0228712 A1* | 9/2011 | Anderson | 370/280 |
| 2011/0255515 A1* | 10/2011 | Maeda et al. | 370/331 |
| 2012/0083302 A1* | 4/2012 | Borran et al. | 455/501 |

* cited by examiner

ENHANCED UPLINK USER ENTITY RATE LIMITATION SIGNALLING

FIELD OF THE INVENTION

This invention is directed to HSUPA base stations and networks. More particularly, the invention relates to the relative grant signalling in Enhanced Uplink and corresponding effects upon the UE transmit capabilities.

BACKGROUND

In release 6 of the WCDMA (Wideband Code Division Multiple Access) specification, a High Speed Uplink Packet Access (HSUPA) (also called Enhanced Uplink) communication scheme is defined in addition to the downlink High Speed Data Packet Access (HSDPA) scheme in order to match the bit rates provided by the latter, so as to cater for improved interactive, background and streaming services. In prior art document 3GPP TS 25.309, "FDD Enhanced Uplink; Overall Description; Stage 2", Version V6.6.0 of 2006-04-06 the Enhanced UL (Uplink) is described.

Relevant sections can moreover be found in 3GPP References TS25.211 and TS25.321.

In FIG. 1, a HSUPA network overview (HSDPA related channels are not included in the figure) is indicated. The network comprises a Core Network communicating with a Radio Network Controller (RNC, S-RNC, B-RNC) over the Iu interface, or Iur interface; a first base station, Node B, B1, a second base station, Node B, B2, both base stations comprising an EUL scheduler unit. The EUL Scheduler (EUL_SCH) is also denoted the MAC-e Scheduler, and communicating with the RNC over respective Iub interfaces.

The following HSUPA channels are transmitted over the air interface; the E-AGCH to convey absolute grant signalling from the MAC-e scheduler towards the UEs, the E-RGCH for relative grant signalling, HICH to convey acknowledgement feedback from Node-B decoding of UE transmitted data, Dedicated Physical Channel (DPCH) or Fractional DPCH to convey Transmit Power Control (TPC) commands, Enhanced DPDCH (E-DPDCH) to convey the MAC-e payload and Enhanced DPCCH (E-DPCCH) to convey the control signalling of the MAC-e.

Node B1 corresponds to the serving cell in this example (E-AGCH is only transmitted from the serving cell) and node B2 corresponds to a non-serving cell.

Document 3GPP TS 25.309 FDD, Enhanced Uplink Overall description, mentioned above gives an overview of the Enhanced Uplink functionality.

In prior art document "High Speed Uplink Packet Access (HSUPA); White Paper, application note 1MA94", Rohde Schwarz, 01.2006, an overview of the HSUPA can also be found.

According to the HSUPA specification, the Enhanced Dedicated Channel (E-DCH) high speed uplink transport channel offers a number of new features such as: short Transmission Time Interval (TTI), Fast Hybrid Automatic Repeat Request (ARQ) with soft recombining, fast scheduling for reduced delays, increased data rates and increased capacity.

When a UE is setting up communication with a Node B, the setup procedure may be followed by a HSDPA session, for e.g. downloading/surfing an internet page using TCP. Depending on the capabilities of the user entity, this may moreover involve HSUPA transmissions whereby Node B that transmits TCP messages on the HSDPA downlink channel will receive TCP acknowledgements on the E-DCH uplink to Node B. Since Node-B determines, or schedules, at which pace a UE shall transmit on E-DCH, Node-B utilises the E-AGCH to convey its scheduling decisions. A shorter delay, measured from the time until a TCP data segment is sent downlink until a TCP acknowledgement as a response is sent uplink, leads to a decreased downloading time of file transfers etc, due to the shorter round trip time estimate of the TCP layer.

During the procedure upon which the user entity becomes ready to use a HSUPA service with Node B, the user entity is informed about which E-AGCH code it is supposed to receive downlink traffic on. For this purpose, the E-AGCH, which is a shared channel within the cell, is used via the RRC (Radio Resource Control) protocol.

E-AGCH channels are configured to a Node B in a configuration or re-configuration procedure with the RNC via the NBAP (Node B Application Part) signalling protocol.

The Node B MAC-e Scheduler issues "absolute grants" on the downlink E-AGCH channel, that is, messages which grant the user entity the right to transmit at given bit rates on the uplink. Since bandwidth needs vary dynamically over time, it is beneficial that the power emissions by user entities are regulated speedily so that bandwidth is not unnecessarily wasted.

The E-AGCH can be defined to have a number of one to several channelization codes (presently, up to four).

A problem in the serving Node-B is that is does not have complete information about the UEs for whom it is responsible for scheduling transmission rates. This lack of knowledge in the serving Node-B may lead to a non-optimal utilization of resources both in the Node-B and on the air.

In order to illustrate the above problem, consider a case with a UE, a serving Node-B, and a non-serving Node-B as shown in FIG. 1 and the handshake diagram of FIG. 3. Note that a UE can be connected to multiple non-serving Node-B in the general case. Consider further that the end user of this UE starts to upload information to the internet, e.g. photo images to a data repository.

The UE starts by transmitting a scheduling request 1 on E-DCH via the SI field or E-DPCCH via the happy bit (set to not happy) to serving Node B. Node B transmits an absolute grant 2 on E-AGCH allowing the UE to transmit at 32 kbps. The UE starts by transmitting data 3 at the given rate but signals not happy 3 in the outband E-DCH control signalling fields in order to increase the data rate.

The serving Node B transmits a new E-AGCH 4 allowing the UE to transmit at 128 kbps 5. However, the UE is still not happy concerning the granted data rate and signals this in the message 5. Subsequently, the serving node B grants 470 kbps to the UE, 6, and the UE transmits at this data rate 7.

At this stage, the non-serving Node B considers that the interference situation is too high and transmits a Broadcast Overload Indication 8, i.e. a signal on the E-RGCH channel with value Down.

The UE receives the Down signal 8 and reduces 9 its rate to 128 kbps. Serving Node B will now detect that the UE signals 9 "not happy" but that the UE seems to transmit at a lower rate than allowed to.

The following problem now appears for the serving Node B.:

1) Has the UE received a Down from a non-serving Node B, and is that the reason why serving Node-B detects a receiving decoded rate lower than the granted rate?
2) Has the UE failed to decode the previous E-AGCH allowing a rate of 470 kbps?
3) Is the lower rate a problem related to e.g. temporarily power issues of the UE?

Regardless whether Node B assumes that case 1, 2 or 3 above has occurred; Node B needs to send out a new absolute grant sooner or later. It shall not wait too long since case 2 above could be the reason why the UE is still unhappy while sending on 128 kbps. If case 1 has happened, the interference situation may also improve quickly.

Hence, after step 9, the serving node B sends out a new absolute grant that allows the UE to transmit at 470 kbps 10, which is followed by the UE, 11.

For the non-serving cell, 128 kbps is the limit and therefore it transmits a down 12. UE regulates its rate to 128 kbps 13 and indicates "Not happy".

As can be seen, the Broadcast Overload Indication 8 causes a toggling situation where the UE rate is increased-decreased-increased which may cause serious interference in all non-serving cells or any cell in the vicinity of the serving cell.

SUMMARY OF THE INVENTION

It is a first object of the invention to improve the uplink resource allocation for a HSUPA capable user entities and base stations. A further object of the invention is to more quickly adapt to changing interference situations.

Therefore, there is provided a method for a user entity UE transmitting data said data being receivable by at least a serving node B1 and a non serving node, B2; the user entity, UE, being adapted for receiving a first signal, ABS GRNT E-AGCH, 4, 6, from a serving node, B1, granting the user entity permission to transmit at a given signalling rate; the user entity, UE, being adapted for receiving a second signal, 8, from a non-serving node, B2, instructing the user entity to limit its signalling rate, DOWN E-RGCH; the user entity, UE, being adapted to transmit data packets and associating a third signal, HAPPY, 7, with the data packet transmission indicating the user entity being content using a signalling rate as granted by the serving node, B1; the user entity, UE, being adapted to transmit data packets and associating a fourth signal, NOT HAPPY, 1, 9, with the data packet transmission indicating the user entity wishing to being granted permission to use a higher signalling rate than it is currently being permitted to use by the serving node, B1. The user entity is being adapted for issuing a signalling rate limitation signal, UE RATE LMT, 9', to the serving node, indicating the user entity having limited its signalling rate signal below the signalling rate granted to it by the serving node B.

In other words, an indication as to the current throughput limitation of a given UE is provided to the serving Node-B. When the serving Node B has knowledge about the current UE throughput limitation, it can avoid increasing the rate until the interference condition has improved for the non-serving Node B.

The above objects have also been achieved by a method for a Node B adapted to operate as a non-serving Node B for HSUPA transmissions, wherein the Node B in its role as a non-serving Node B is adapted for issuing a Down signal, 8, when the interference level has reached a first level, wherein the non-serving Node B when the interference level has improved, 9'', below the first level to a second level, the non-serving Node B, B2, transmitting on the E-RGCH, a signal, E-RGCH CEASE 14, 15', being indicative of a cease of the interference situation.

There is moreover provided a method for a Node B, wherein, an additional signal indicative of a cease of an interference situation 9'' is transmitted to recover from a situation where a UE failed to receive a previous transmitted signal, E-RGCH CEASE 14, being indicative of a cease of an interference situation.

There is moreover provided a method for Node B adapted to operate as a non-serving Node B for HSUPA transmissions, wherein the Node B in its role as a non-serving Node B is adapted for issuing a Down signal, 8, when the interference level has reached a first level, wherein the non-serving Node B, B2, transmitting on the E-RGCH, a signal E-RGCH CEASE 14, being indicative of a cease of an interference situation, the non-serving Node-B transmitting the signal indicative of a cease of an interference situation spontaneous or unsolicited.

Moreover, user entity and Node B apparatuses are provided adapted to carry out the above methods.

According to the invention, disturbances for UEs in the cell under the serving Node-B are reduced or avoided. Moreover, according to the invention, the demands on hardware resources may be lessened in Node B, due to the avoidance of unnecessary excessive signal rate allocations. By allocating limited decoding resources in the serving Node-B more effectively, unnecessary resource and bandwidth allocations are also reduced or avoided. Generally, a positive effect on higher layers—for example, on the round trip time estimate of the TCP layer—is achieved according to the invention due to the restriction of varying UE signalling rates.

Further advantages of the invention will appear from the following detailed description of the invention.

DETAILED DESCRIPTION OF PREFERRED EMBODIMENTS OF THE INVENTION

First Aspect of the Invention

According to a first embodiment of the invention, a current UE throughput data rate limitation condition for the given UE is signalled to the serving Node-B via a new uplink control information message denoted UE Rate Limitation, 9' in short for UE rate limitation indication.

Figure 3:
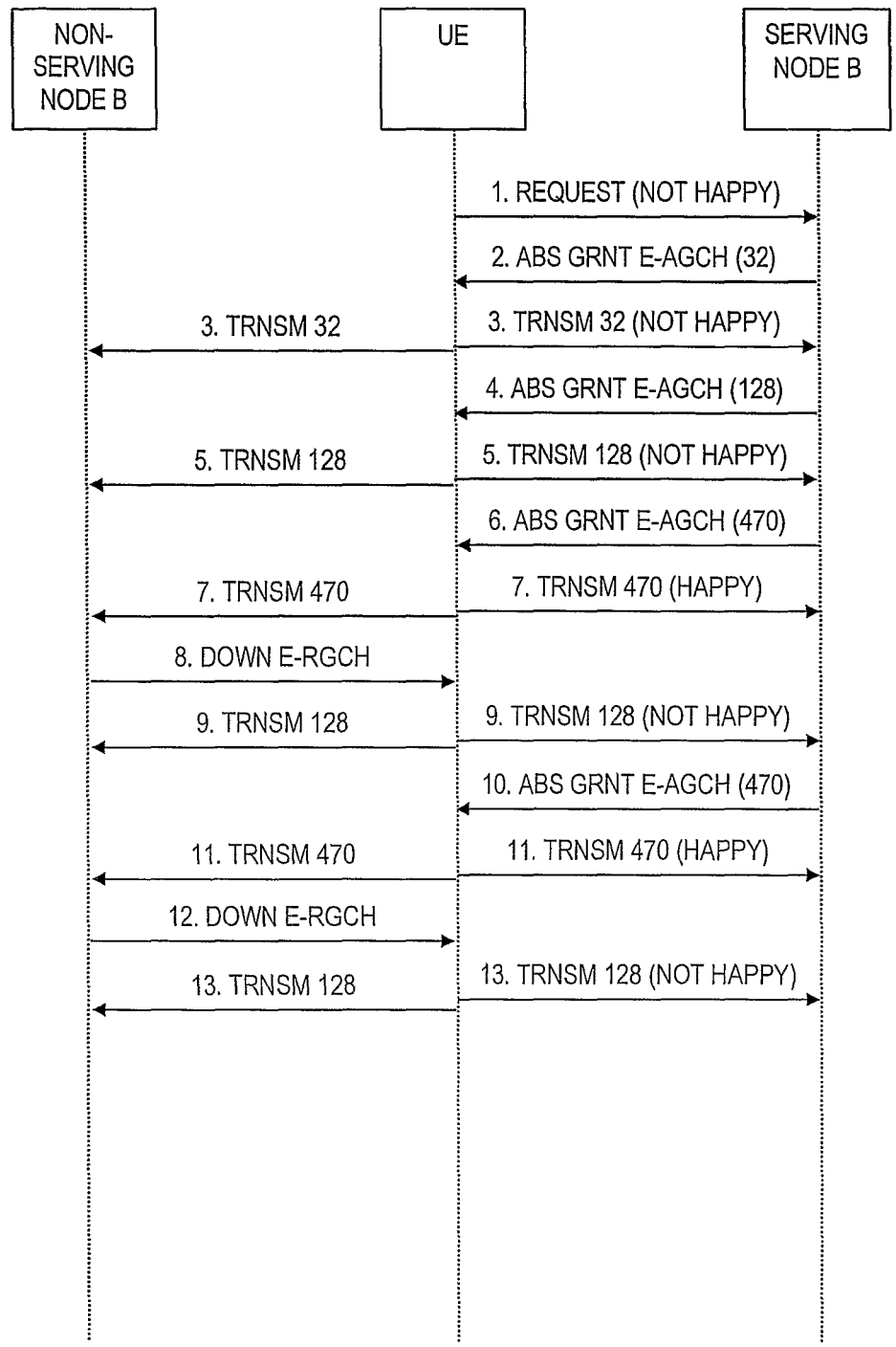
Figure 4:
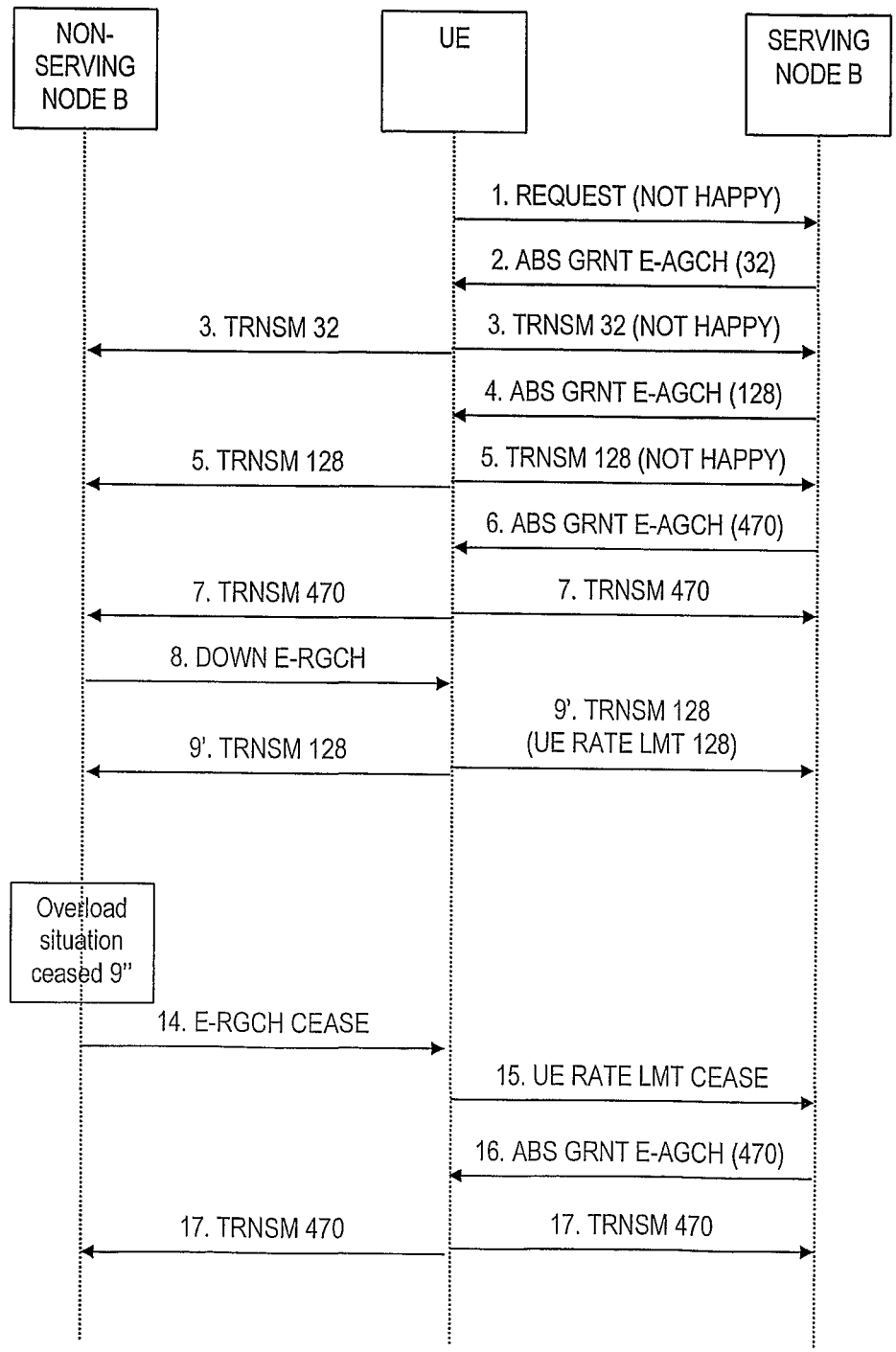
FIG. 4 shows a first embodiment of the invention.

In FIG. 4, showing an exemplary scenario according to the first embodiment of the invention, a UE according to the invention has received a Down E-RGCH 8, from a non-serving Node-B leading the UE to regulating its transmit rate. By way of example, the steps 1 to 8 corresponds to the steps explained with reference to FIG. 3.

The UE now transmits the UE Rate Limitation signal 9' to the serving Node-B, indicating a data rate of 128 kbps, according to the present example. By issuing this signal and by the UE limiting its current maximum data rate by which it transmits, the UE informs the serving Node-B about the situation in order for the serving Node-B to temporary avoid granting rates higher than the current maximum rate defined by the content of the UE Rate Limitation signal.

Consequently, serving Node-B determines to avoid granting the UE to transmit with a rate higher than what is indicated in the UE Rate Limitation signal. The scheduler in the given Node B takes advantage of this situation by not allocating any resources for a higher rate than 128 kbps for the UE in question. In contrast with the situation in FIG. 3, the absolute grant signal 10 is not issued.

In other words, there is provided a method for a user entity UE transmitting data said data being receivable by at least a serving node B1 and a non serving node B2; the user entity, UE being adapted for receiving a first signal, ABS GRNT E-AGCH, 4, 6 from a serving node B1 granting the user entity permission to transmit at a given signalling rate; the user entity E being adapted for receiving a second signal 8 from a non-serving node B2 instructing the user entity to limit its signalling rate DOWN E-RGCH; the user entity UE being adapted to transmit data packets and associating a third signal HAPPY, 7 with the data packet transmission indicating the user entity being content using a signalling rate as granted by the serving node B1; the user entity, UE being adapted to transmit data packets and associating a fourth signal NOT HAPPY, 1, 9 with the data packet transmission indicating the user entity wishing to being granted permission to use a higher signalling rate than it is currently being permitted to use by the serving node, B1. The user entity being adapted for issuing a signalling rate limitation signal, UE RATE LMT, 9' to the serving node, indicating the user entity having limited its signalling rate signal below the signalling rate granted to it by the serving node B.

The UE Rate Limitation 9' signal preferably comprises:
the currently decoded Absolute Grant Index (6 bits)
the Maximum allowed SG (Serving Grant) index,
or alternatively
only the Maximum allowed SG (Serving Grant) index.

The UE maintains a serving grant (SG) value which represents the maximum power ratio the UE may use (as perceived by the UE) in the next transmission.

It should be noted that the data transmission rates shown in the handshake diagrams of the present application are the actual exemplary data transmission values used by the UE that (and hence may not correspond directly to the information in the serving grants SG. It should be understood that the data rates shown in the diagrams are exemplary data rates by which the UE transmits. The serving grants are coded as indexes that represent a maximum power ratio but they can be converted to, or interpreted as, a specific data rate that the UE is allowed to use. In the context of the present invention the term signalling rate is used for data rate, alternatively power ratio.

Figure 2A:
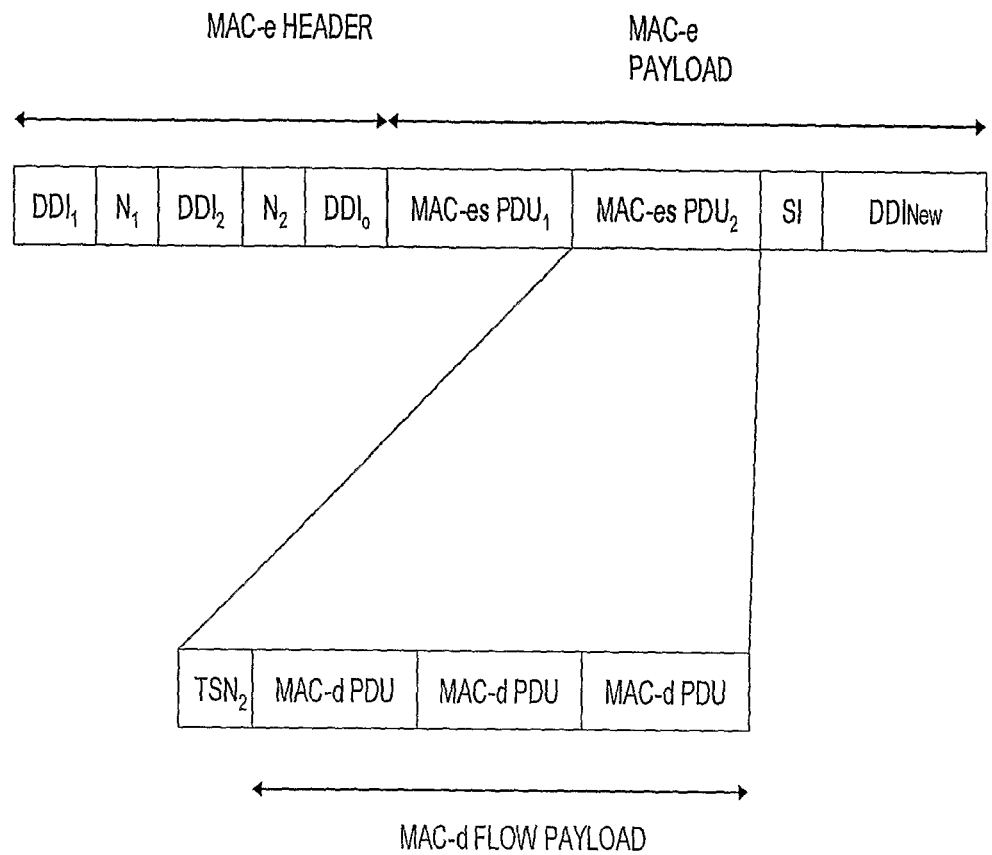
FIG. 2a shows the signalling format according to an embodiment of the invention based on an excerpt of the release 6, HSUPA specification concerning timing MAC-e header and payload.

According to the first aspect of the invention, the signalling is implemented in correspondence with current 3GPP specifications:

As shown in FIG. 2a, as a first option according to the present invention, the MAC-e SI field comprises the UE Rate Limitation 9' (or signal 15, as explained below) message. The current SI field shall not increase in length, but bits shall be decoded such that it is possible to signal the UE Rate Limitation 9'. As an example, the value 4'b1111 of the $DDI_0$ field could indicate that the SI field conveys the UE Rate Limitation message.

Figure 2B:
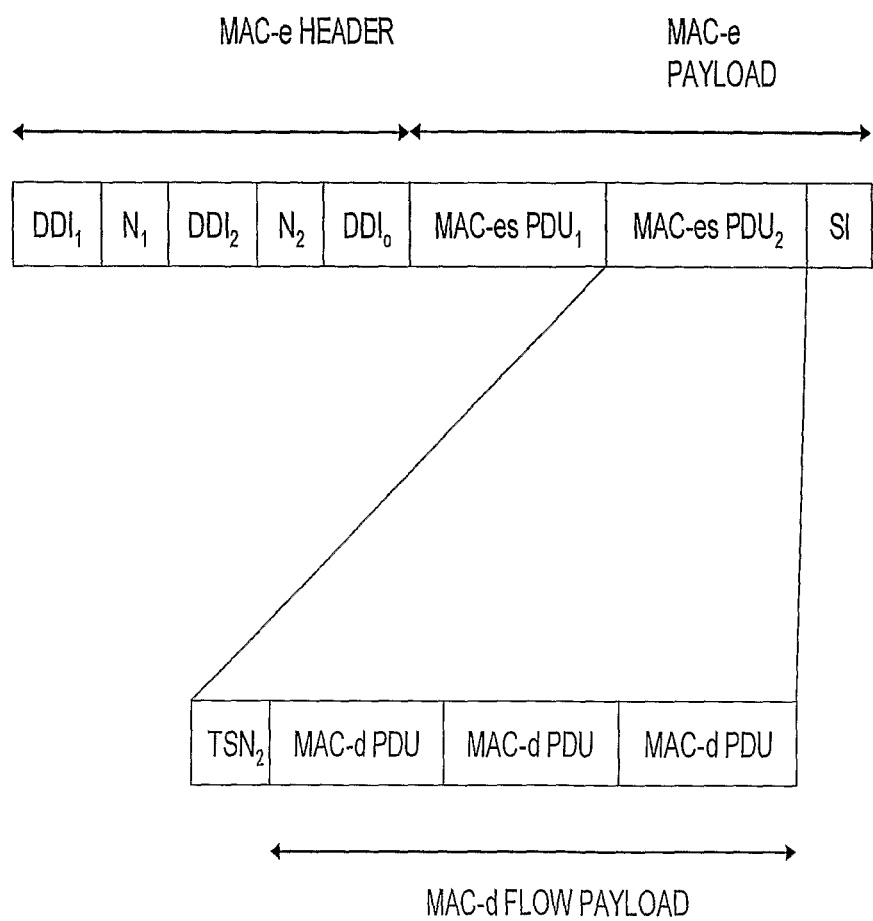
FIG. 2b shows an alternative to FIG. 2a, FIG. 3 shows a possible prior art scenario concerning a UE, a serving node B and a non serving node B.

As an alternative option, as indicated in FIG. 2b, a new field $DDI_{New}$ similar to the MAC-e SI field is used. Here, the new MAC-e DDI value contain the UE Rate Limitation signal.
Second Aspect of the Invention As is known, the serving node B may issue relative grants in the form of UP and DOWN instructions. However, according to the current 3GPP it is not provided for a non-serving Node B to transmit an "UP" on the E-RGCH.

According to a second aspect of the invention the invention, the non-serving Node B may transmit an up-indication to the UE in question on the E-RGCH.

By way of example, the up-indication could be issued, after the non-serving Node B due to an interference situation transmitted an E-RGCH Down to a UE: When the non-serving Node B detects that the interference conditions has improved from the first level causing it to issue the Down to a second level, the non-serving Node transmits a new E-RGCH signal with value Up. According to the invention, a new coding of the non-serving E-RGCH should is provided.

According to the second aspect of the invention, and as illustrated in FIG. 4, when the UE decodes the Up message, it creates a new uplink control message denoted E-RGCH CEASE comprising:
Currently decoded Serving Grant Index
Maximum SG index=invalid (no longer active)
Which UE that is concerned is implicitly given—since node B knows always with which UE it is communicating.

The E-RGCH CEASE from a non-serving Node B may indicate that a previous interference situation causing trouble for the non-serving Node B has now ceased.

Returning to FIG. 4, say that the E-RGCH Down signal 8 was due to an overload signal which has subsequently ceased at the non-serving node B, cf. 9", the non-serving node B signals an E-RGCH CEASE 14 according to the second aspect of the invention.

As a further option to the first embodiment, the UE signals an UE Rate Limitation Cease signal 15 when the current throughput limitation has ceased in order to release the limit previously signalled.

By way of example, this is moreover being illustrated in FIG. 4, the non-serving node B signals an E-RGCH cease indication 14 upon the overload situation having ceased. The UE subsequently transmits at 128 kbps and signals a UE rate limitation cease indication signal 15.

The serving node can subsequently grant an absolute grant at a higher rate 16, e.g. by 470 kbps and the UE can transmit at this granted rate 17.

In other words there is provided a method for a Node B adapted to operate as a non-serving Node B for HSUPA transmissions, wherein the Node B in its role as a non-serving Node B is adapted for issuing a Down signal, 8 when the interference level has reached a first level, wherein the non-serving Node B when the interference level has improved, 9" below the first level to a second level, the non-serving Node B, B2 transmitting on the E-RGCH, a signal, E-RGCH CEASE 14, 15' being indicative of a cease of the interference situation.

The UE may decide to signal the UE rate limitation indication 9' and its subsequent cease signalling 15 for other reasons than initiated by a non-serving node.

Figure 5:
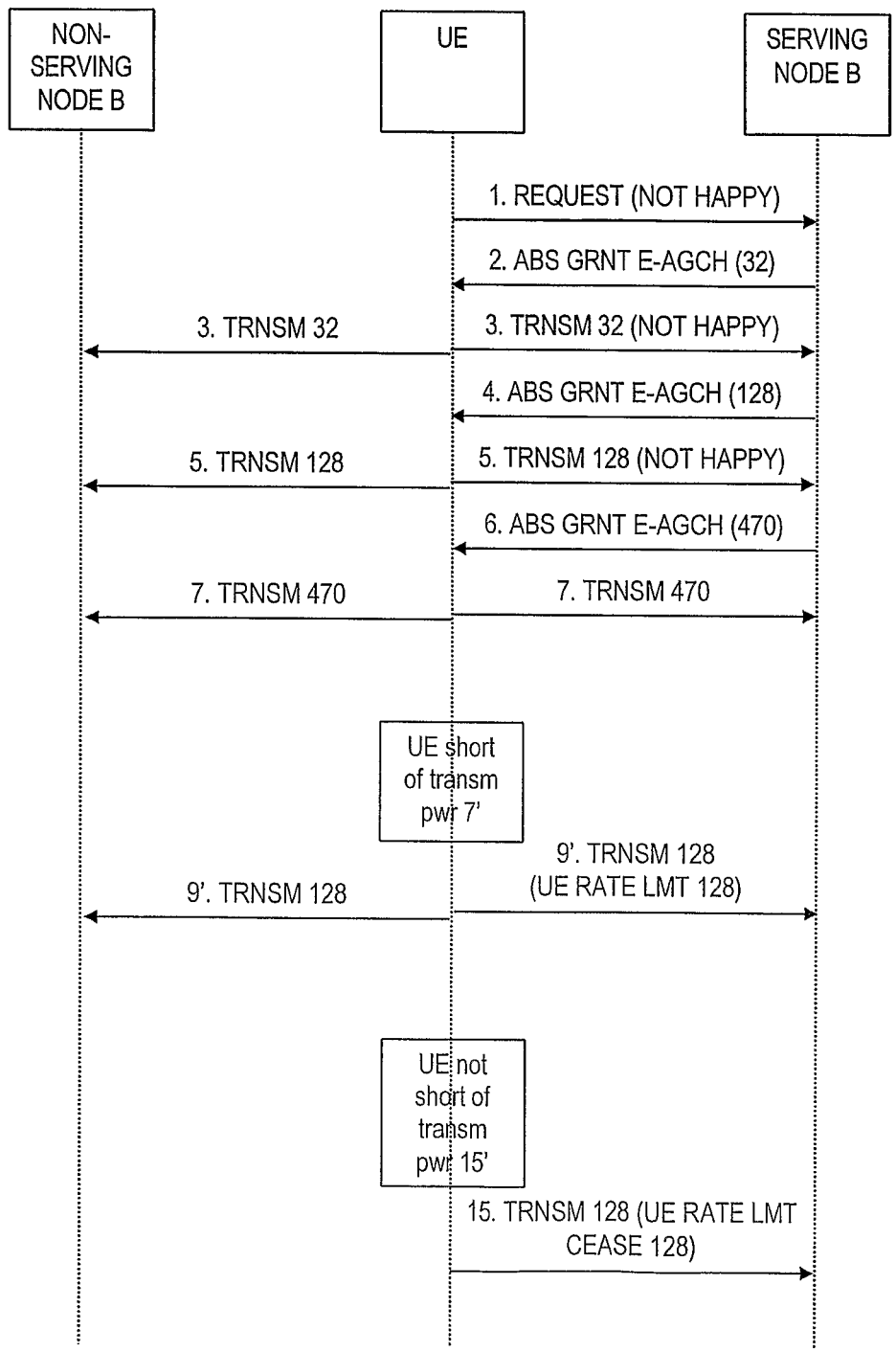
FIG. 5 shows a further embodiment of the invention.

In FIG. 5, the battery power deficiency/power-shortage situation 7' in the UE may lead to the UE not being able to transmit at full output power, this circumstance leading to the UE rate limitation indication signal 9' being issued and the transmission rate of the UE being limited. The power-shortage may be due to the UE temporarily using its power for other tasks so that it is prevented to transmit at the highest allowed power as indicated by the E-AGCH. The maximum emitted power for an UE may be dependent upon regulatory issues such as the maximum allowed transmit power or thermal limitations or to a maximum energy consumption limitation, where the UE is powered from a USB or PCMCIA interface, or to a temporary energy storage limitation where the UE utilises a capacitor to store energy for transmission.

As the power situation improves, 15', the UE signals the UE rate limitation cease indication signal 15.

According to the above signalling of the first and second aspect of the invention, the EUL scheduler in the Serving node B will have better knowledge about the actual UE throughput limitation. Thereby, the following effects are accomplished:

Toggling effects are avoided in the network where the UE increases/decreases/increases, etc., its rate, thereby negatively affecting the round trip time as seen by higher layer, e.g. TCP. Moreover, the interference disturbance from the UE in neighbouring cells when it toggles up to the high rate (in this example 470 kbps) is minimized. The interference disturbance that the UE causes will not only affect the ability in the node B to decode the given disturbing UE, but it affects the ability to decode all the other UEs within that cell.

Moreover, unnecessary allocations of decoding capabilities in Node B are avoided. The bandwidth in the cell is utilized more efficiently by avoiding situations where an increased rate is given to a first user not capable of using it where a second user is decreased in rate due to the first users increased rate.

Figure 6:
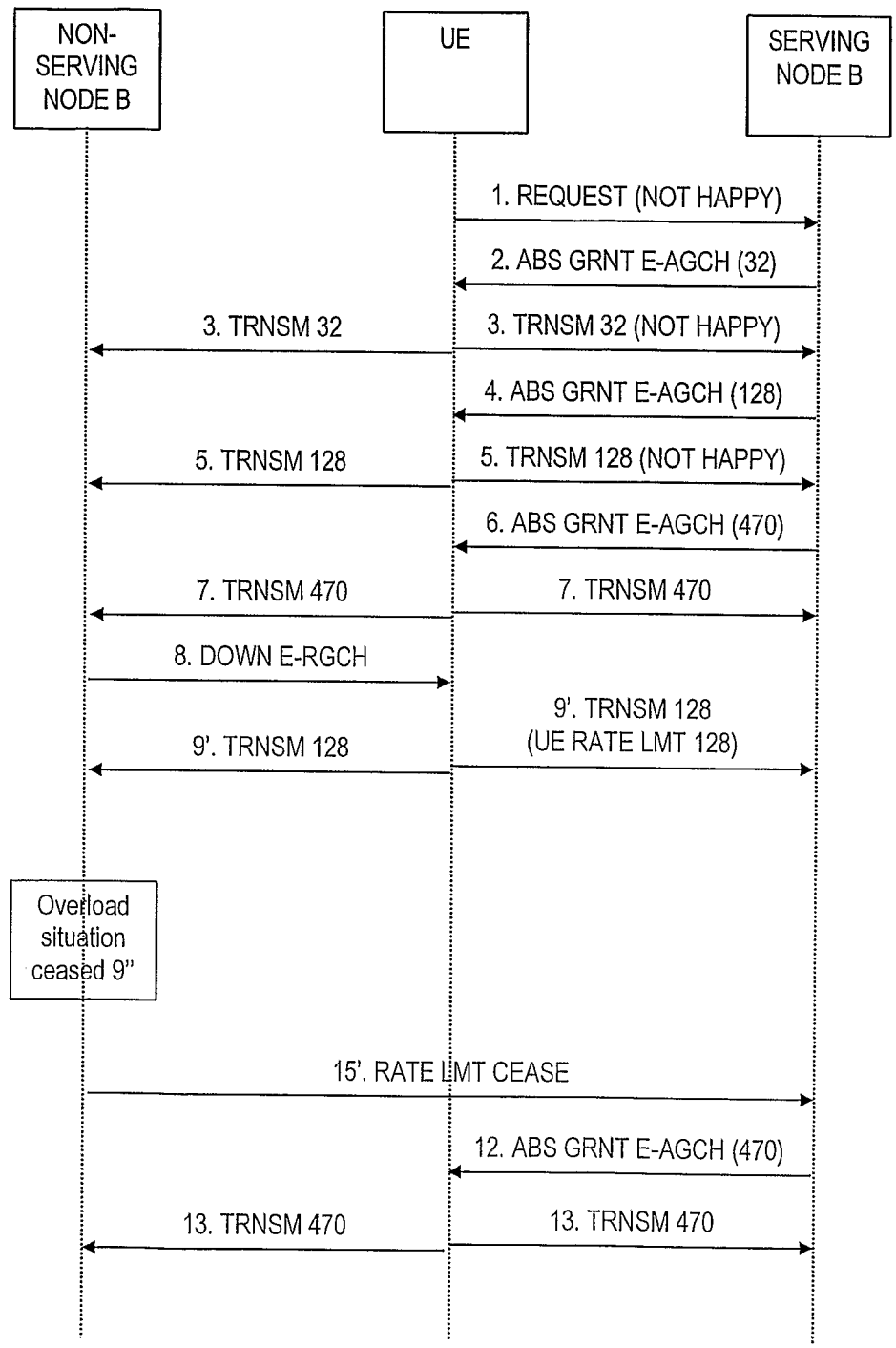
FIG. 6 shows a further embodiment of the invention.

In FIG. 6, a further embodiment of the invention is shown. According to an exemplary scenario, an overload situation at the non-serving node B ceased 9" as previously shown in FIG. 4.

Figure 1:
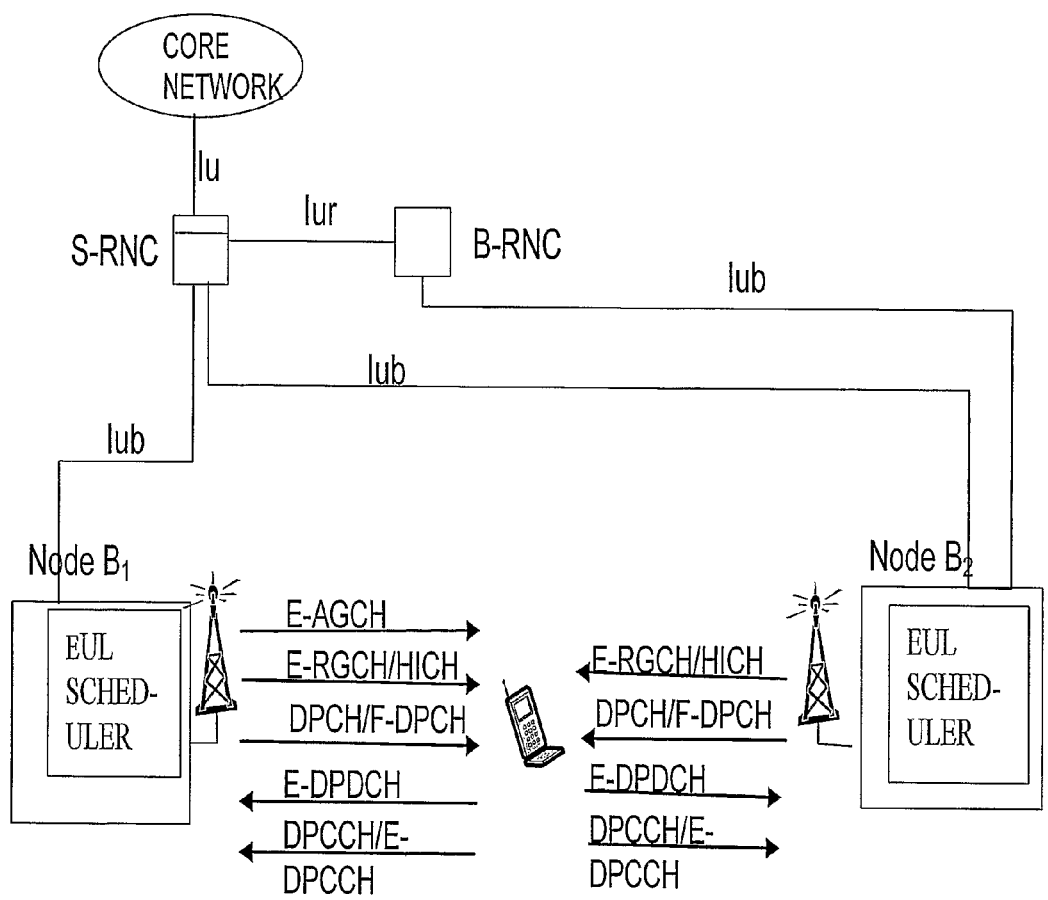
FIG. 1 shows basic elements of a prior art HSUPA network and signalling.

According to this embodiment, the non-serving node B, issues a Rate limitation cease 15' over the Iub/Iur interface, as shown in FIG. 1, to the serving Node. This signal comprises preferably only one value, namely the E-RNTI value, which corresponds to the identity of the UE concerned. E-RNTI is found in 3GPP and stands for "E-DCH Radio Network Temporary Identifier".

The signalling which follows depends on the serving node B, which likely will grant the UE to transmit at a higher data rate 12 than previously limited by the UE.

According to a second aspect of the invention, the non-serving Node-B may transmit a ERGCH Cease signal 14 due to other reasons than an overload situation 9" having ceased, e.g. spontaneous or unsolicited, e.g. to signal that the Node B has recovered from a situation where a UE failed to receive a previous Rate Limitation Cease signalling 14 message.

In other words there is provided a method for a Node B, wherein, an additional signal indicative of a cease of an interference situation 14 is transmitted to recover from a situation where a UE failed to receive a previous transmitted signal, E-RGCH CEASE 14 being indicative of a cease of an interference situation.

There is also provided a method for Node B adapted to operate as a non-serving Node B for HSUPA transmissions, wherein the Node B in its role as a non-serving Node B is adapted for issuing a Down signal 8 when the interference level has reached a first level, wherein the non-serving Node B, B2, transmitting on the E-RGCH, a signal, E-RGCH CEASE 14 being indicative of a cease of an interference situation, the non-serving Node-B transmitting the signal indicative of a cease of an interference situation 14 spontaneous or unsolicited.

Figure 7:
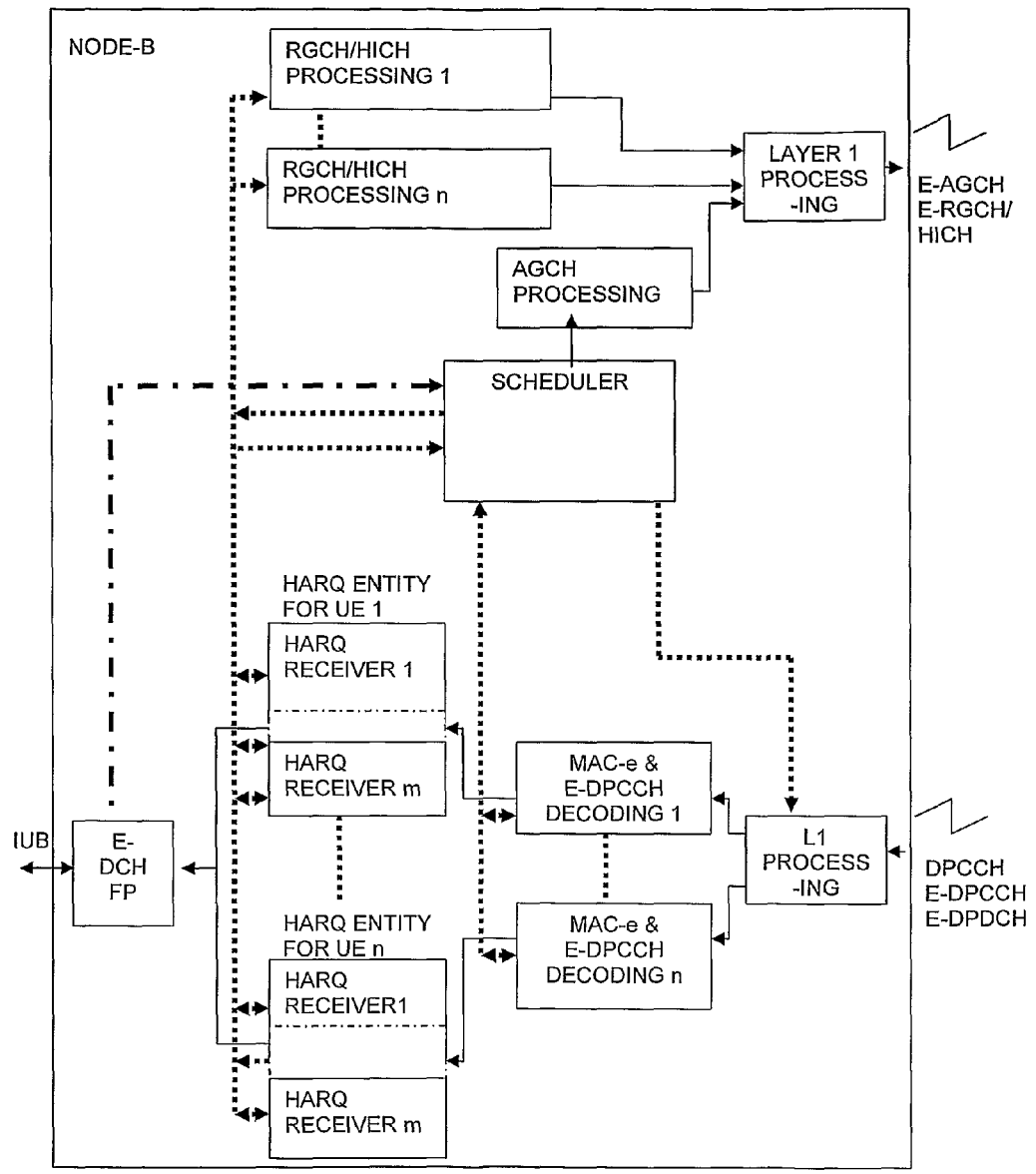
FIG. 7 shows an exemplary base station according to the invention.

In FIG. 7, an exemplary base station according to the invention is shown, also denoted Node B, being capable of operating both as a serving base station and as a non-serving base station.

The base station comprises RGCH/HICH processing stages 1-n, layer 1 processing, AGCH processing, a scheduler, respective HARQ entities for user entities 1-n, each HARQ entity comprising plurality of HARQ receivers for receiving packets 1-m according to the HARQ process for each user entity. Node B moreover comprises Layer 1 processing means for communicating over E-AGCH and E-RGCH channels over the air interface, L1 processing means for communicating over DPCCH, E-DPCCH and E-DPDCCH channels. Moreover, the base station comprises E-DPCH FP means for communicating over the iub interface. MAC-e EDPCCH decoding means 1-n is provided for HARQ entities for UE 1-n. According to the invention, the method steps concerning Node B according to the invention may be implemented as a programme in the scheduler.

According to the invention there is provided, a Node B adapted to operate as a non-serving Node B for HSUPA transmissions, wherein the Node B in its role as a non-serving Node B is adapted for issuing a Down signal, 8 when the interference level has reached a first level. The non-serving Node B when the interference level has improved 9" below the first level to a second level, the non-serving Node B, B2, transmitting on the E-RGCH, a signal, E-RGCH CEASE 14, 15', being indicative of a cease of the interference situation.

In preferred embodiments, the signal indicative of the cease of the interference situation, 14 is issued to a UE.

The signal indicative of the cease of the interference situation, 15' may be issued to a serving Node over the core network, via interfaces Iur, Iub, Iu.

Moreover, an additional signal indicative of a cease of an interference situation 15 is transmitted to recover from a situation where a UE failed to receive a previous transmitted signal, E-RGCH CEASE 14, 15' being indicative of a cease of an interference situation.

There is also provided a Node B adapted to operate as a non-serving Node B for HSUPA transmissions, wherein the Node B in its role as a non-serving Node B is adapted for issuing a Down signal, 8 when the interference level has reached a first level. The non-serving Node B, B2 transmitting on the E-RGCH, a signal, E-RGCH CEASE 14 being indicative of a cease of an interference situation, the non-serving Node-B transmitting the signal indicative of a cease of an interference situation 9", however, spontaneous or unsolicited, that is, not necessarily reasoned by an actual interference level, but for other reasons.

Figure 8:
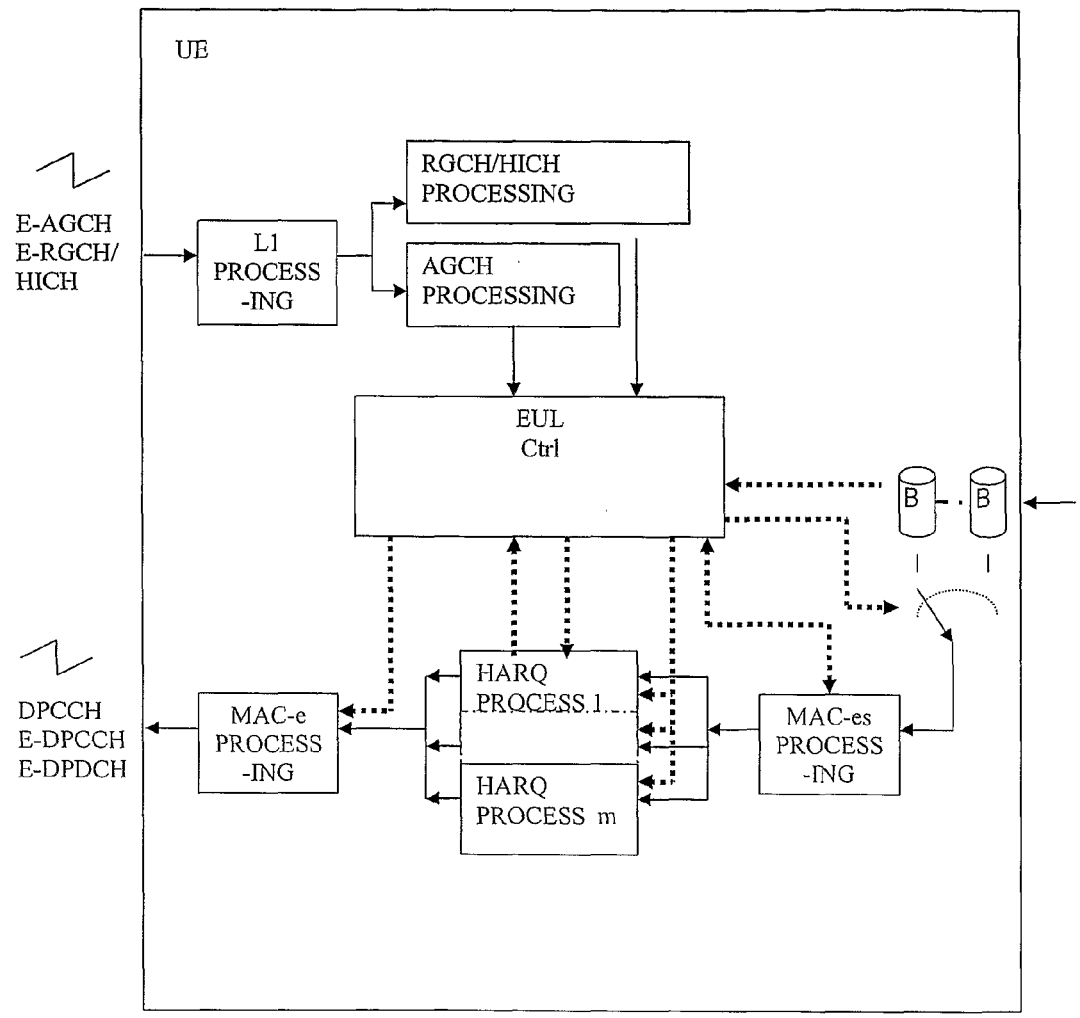
FIG. 8 shows an exemplary user entity according to the invention.

In FIG. 8, a user entity UE according to the invention is shown. The user entity comprises L1 processing Means, MAC-e processing means, for communicating over the same channels as mentioned under FIG. 7, RGCH/HICH processing means, AGCH processing, EUL control means, EUL ctrl, HARQ process stages 1-m for HARQ processes 1-m associated with the UE, and MAC-es processing means. There is moreover provided buffers, B, connected with higher protocol stacks of the user entity. According to the invention, the method steps concerning the user entity as previously described is carried out as a programme in the EUL control means.

There is provided (according to the invention, a user entity, UE adapted for transmitting data said data being receivable by at least a serving node, B1 and a non serving node, B2; the user entity, UE being adapted for receiving a first signal, ABS GRNT E-AGCH, 4, 6 from a serving node, B1 granting the user entity permission to transmit at a given signalling rate; the user entity, UE being adapted for receiving a second signal, 8 from a non-serving node, B2 instructing the user entity to limit its signalling rate, DOWN E-RGCH; the user entity, UE being adapted to transmit data packets and associating a third signal, HAPPY, 7 with the data packet transmission indicating the user entity being content using a signalling rate as granted by the serving node, B1; the user entity, UE being adapted to transmit data packets and associating a fourth signal, NOT HAPPY, 1, 9 with the data packet transmission indicating the user entity wishing to being granted permission to use a higher signalling rate than it is currently being permitted to use by the serving node, B1. The user entity is adapted for issuing a signalling rate limitation signal, UE RATE LMT, 9' to the serving node, indicating the user entity having limited its signalling rate signal below the signalling rate granted to it by the serving node B.

The invention claimed is:

1. A method for a user entity transmitting data said, data being receivable by at least a serving node and a non serving node, the method comprising:
    said user entity receiving a first signal from a serving node granting the user entity permission to transmit at a given signalling rate:
    said user entity receiving a second signal from a non-serving node instructing the user entity to limit its signalling rate;
    said user entity transmitting data packets and associating a third signal with the data packet transmission indicating the user entity is using a signalling rate as granted by the serving node;
    said user entity transmitting data packets and associating a fourth signal with the data packet transmission indicating the user entity wants to be granted permission to use a higher signalling rate than it is currently being permitted to use by the serving node; and
    said user entity issuing a signalling rate limitation signal to the serving node, indicating the user entity having limited its signalling rate below the signalling rate granted to it by the serving node.

2. The method according to claim 1, wherein the user entity issues the signalling rate limitation signal when the user entity resolves that it has received a signal from a non-serving node requesting the user entity to limit its signalling rate.

3. The method according to claim 2, wherein the user entity resolves a cessation of a condition which gave rise to the issuance of the signalling rate limitation signal when receiving a specific signal from the non-serving node indicating that the data transmissions from the user entities are not disturbing the non-serving node any longer.

4. The method according to claim 1, wherein said rate limitation signal is issued when the user entity resolves that it is short of transmission power.

5. The method according to claim 1, further comprising issuing a signal indicating the cessation of a condition which initiated the user entity to issue the signal indicating the user entity having limited its signalling rate.

6. A method for a Node B adapted to operate as a non-serving Node B for HSUPA transmissions, the method comprising:
    the Node B in its role as a non-serving Node B issuing a Down signal, instructing a user entity to limit its signaling rate, when an interference level has reached a first level, and
    when the interference level has improved below the first level to a second level, the non-serving Node B transmitting, a signal being indicative of a cessation of an interference situation.

7. The method for a Node B according to claim 6, wherein the signal indicative of the cessation of the interference situation is issued to a user entity on the E-RGCH.

8. The method for Node B according to claim 6, wherein the signal indicative of the cessation of the interference situation is issued to a serving Node over a radio network controller.

9. The method for a Node B according to claim 6, wherein, an additional signal indicative of a cessation of an interference situation is transmitted to recover from a situation where a user entity failed to receive a previous transmitted signal being indicative of a cessation of an interference situation.

10. A method for Node B adapted to operate as a non-serving Node B for HSUPA transmissions, the method comprising:
    the Node B in its role as a non-serving Node B issuing a Down signal, instructing a user entity to limit its signaling rate, when an interference level has reached a first level, and
    the non-serving Node B transmitting, a signal being indicative of a cessation of an interference situation, the signal being spontaneous or unsolicited.

11. A user entity adapted for transmitting data said data being receivable by at least a serving node and a non serving node, the user entity comprising:
    at least one processor: and
    at least one memory, said memory containing instructions executable by said processor, whereby said user entity is operative to:
        receive a first signal from a serving node granting the user entity permission to transmit at a given signalling rate;
        receive a second signal from a non-serving node instructing the user entity to limit its signalling rate;
        transmit data packets and associating a third signal with the data packet transmission indicating the user entity is using a signalling rate as granted by the serving node;
        transmit data packets and associating a fourth signal with the data packet transmission indicating the user entity wants to be granted permission to use a higher signalling rate than it is currently being permitted to use by the serving node; and
        issue a signalling rate limitation signal to the serving node, indicating the user entity having limited its signalling rate below the signalling rate granted to it by the serving node.

12. The user entity according to claim 11, wherein the user entity issues the signalling rate limitation signal when the user entity resolves that it has received a signal from a non-serving node requesting the user entity to limit its signalling rate.

13. The user entity according to claim 12, wherein the user entity resolves a cessation of a condition which gave rise to the issuance of the signalling rate limitation signal when receiving a specific signal from the non-serving node indicating that the data transmissions from the user entities are not disturbing the non-serving node any longer.

14. The user entity according to claim 11, wherein said rate limitation signal is issued when the user entity resolves that it is short of transmission power.

15. The user entity according to claim 14, wherein said user entity is adapted for issuing a signal indicating the cessation of a condition which initiated the user entity to issue the signal indicating the user entity having limited its signalling rate.

16. A Node B adapted to operate as a non-serving Node B for HSUPA transmissions, the Node B comprising:
    at least one processor; and at least one memory said memory containing instructions executable by said processor, whereby said Node B is operative to:
  in its role as a non-serving Node B issue a Down signal, instructing a user entity to limit its signaling rate, when an interference level has reached a first level, and
  when the interference level has improved below the first level to a second level, transmit a signal being indicative of a cessation of an interference situation.

17. The Node B according to claim 16, wherein the signal indicative of the cessation of the interference situation is issued to a user entity on the E-RGCH.

18. The Node B according to claim 16, wherein the signal indicative of the cessation of the interference situation is issued to a serving Node over a radio network controller.

19. The Node B according to claim 16, wherein, an additional signal indicative of a cessation of an interference situation is transmitted to recover from a situation where a user entity failed to receive a previous transmitted signal being indicative of a cessation of an interference situation.

20. A Node B adapted to operate as a non serving Node B for HSUPA transmissions, the Node B comprising:
  at least one processor: and
  at least one memory, said memory containing instructions executable by said processor, whereby said Node B is operative to:
    in its role as a non-serving Node B issue a Down signal, instructing a user entity to limit its signaling rate, when an interference level has reached a first level, and
    transmit, a signal being indicative of a cessation of an interference situation, the signal being spontaneous or unsolicited.

* * * * *

UNITED STATES PATENT AND TRADEMARK OFFICE
CERTIFICATE OF CORRECTION

| | | |
|---|---|---|
| PATENT NO. | : 8,804,548 B2 | Page 1 of 1 |
| APPLICATION NO. | : 12/745941 | |
| DATED | : August 12, 2014 | |
| INVENTOR(S) | : Lindskog et al. | |

It is certified that error appears in the above-identified patent and that said Letters Patent is hereby corrected as shown below:

On the Title Page, in Item (57), under "ABSTRACT", in Column 2, Line 22, delete "a situation signal" and insert -- a signal --, therefor.

On the Title Page, in Item (57), under "ABSTRACT", in Column 2, Line 23, delete "cease ceased 9" of" and insert -- cease of --, therefor.

In the Specification

In Column 8, Line 45, delete "Means," and insert -- means, --, therefor.

In Column 8, Line 56, delete "provided (according" and insert -- provided, according --, therefor.

In the Claims

In Column 9, Line 19, in Claim 1, delete "rate:" and insert -- rate; --, therefor.

In Column 10, Line 24, in Claim 11, delete "processor: and" and insert -- processor; and --, therefor.

In Column 11, Line 1, in Claim 16, delete "memory said" and insert -- memory, said --, therefor.

In Column 12, Line 4, in Claim 20, delete "non serving" and insert -- non-serving --, therefor.

In Column 12, Line 6, in Claim 20, delete "processor: and" and insert -- processor; and --, therefor.

Signed and Sealed this
Twenty-sixth Day of May, 2015

Michelle K. Lee
*Director of the United States Patent and Trademark Office*